INVENTORS
CLYDE L. BOWMAN
MAYNARD J. DE GOOD
BY
ATTORNEYS

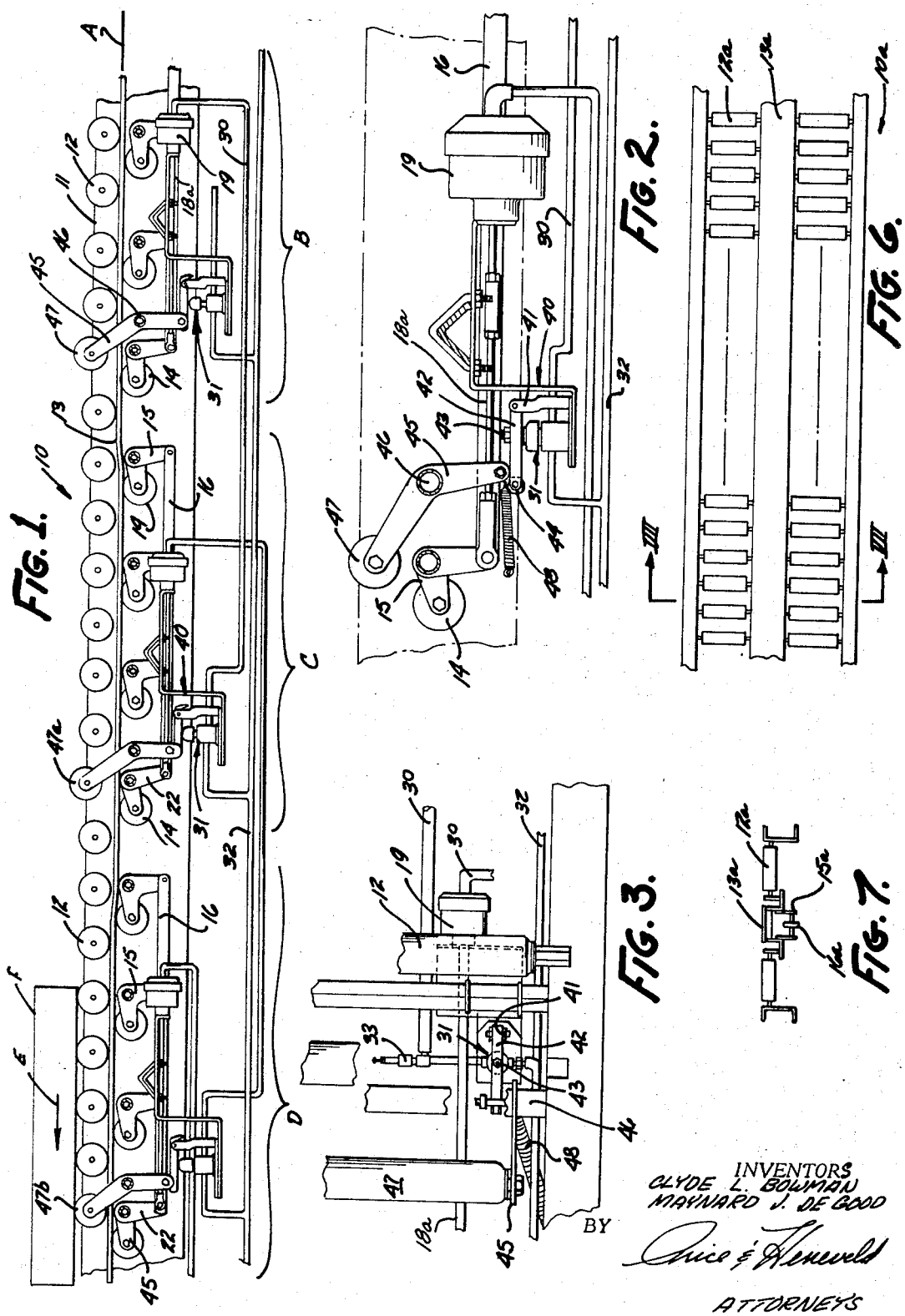

United States Patent Office 3,420,355
Patented Jan. 7, 1969

3,420,355
ACCUMULATOR CONVEYOR WITH PNEUMATIC DELAY
Maynard J. De Good and Clyde L. Bowman, Grand Rapids, Mich., assignors to Rapistan Incorporated, a corporation of Michigan
Filed Oct. 20, 1966, Ser. No. 588,071
U.S. Cl. 198—127          2 Claims
Int. Cl. B65g 13/02

ABSTRACT OF THE DISCLOSURE

This invention discloses an accumulator conveyor of the type having a powered propelling member passing through a plurality of independent operating zones arranged in tandem along the conveyor. In each zone, the propelling member is held in article propelling position by a pneumatically powered mechanism. Each zone has a sensor which, when activated by an article, shuts off the supply of air under pressure to the mechanism in the zone immediately up stream of the article activating the sensor. A bleed port is provided between the air supply shutoff and the mechanism which delays the reaction of the mechanism to shut off the air supply a time interval sufficient to allow one article to pass over and release the sensor.

---

Figure 4:
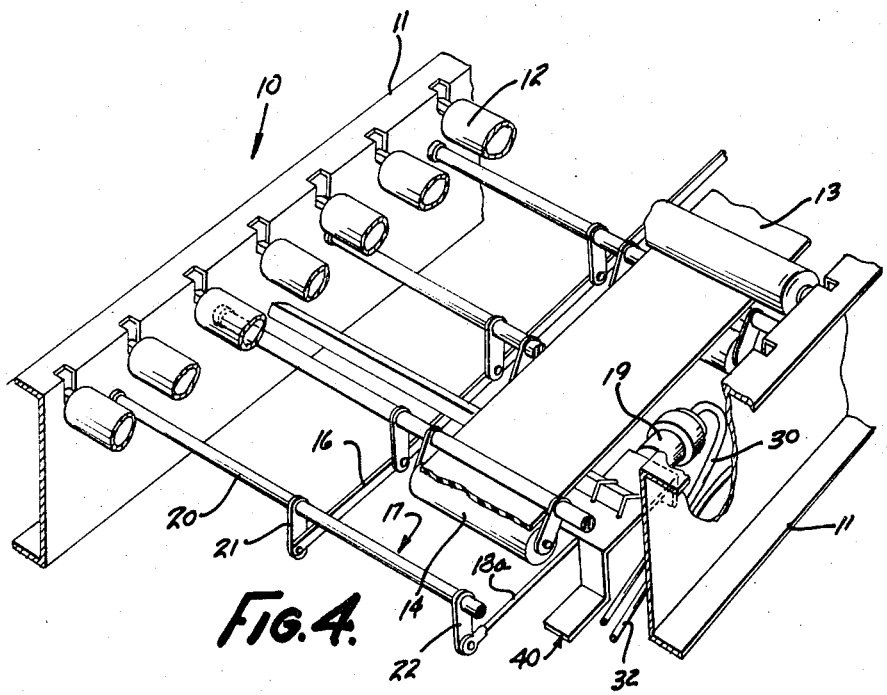

This invention relates to accumulator conveyors and more particularly to an accumulator conveyor in which delivery or non-delivery of the propelling force to the articles is pneumatically controlled with a predetermined time delay between the sensing of an accumulation condition and the response thereto. The invention constitutes an improvement over the accumulator conveyors disclosed in United States Letters Patents 3,012,652, 3,062,-359 and 3,156,345.

The improvement of this invention lies in the fact that the conveyor utilizes compact, lightweight, simple and relatively inexpensive means to effect control of the movement of articles along its track and also incorporates a time delay between the sensing of an article and the response of the article movement control means. Thus, the control means does not respond to the normal flow of articles, but only to an unusual condition resulting from the cessation or substantial slowing of the article movement. This arrangement reduces noise, wear and maintenance. A further improvement lies in the fact that the element effecting the time control is readily adjustable, thus, permitting the same element to be used in all conveyors of this type, even though the particular uses of the conveyors require a wide range in the length of this time interval.

These and other objects and advantages of this conveyor will be readily understood by those versed in the conveyor art upon reading the following specification and the accompanying drawings.

Figure 5:
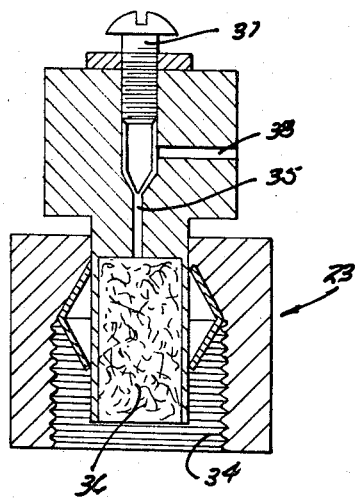

In the drawings:
FIG. 1 is a sectional, elevation view of a roller conveyor incorporation this invention.
FIG. 2 is an enlarged fragmentary side elevation view of a sensor, valve and actuator complex utilized in this invention;
FIG. 3 is a fragmentary, plan view of the structure shown in FIG. 2;

FIG. 4 is a fragmentary, oblique view of a conveyor embodying this invention;
FIG. 5 is an enlarged, fragmentary view of the air bleed valve used in this invention;
FIG. 6 is a schematic, plan view of conveyor embodying this invention in which the propelling member is normally coplanar with the tops of the article supporting rollers;
FIG. 7 is a schematic, sectional elevation view taken along the plane VII—VII of FIG. 6.

In executing this invention, the vertically shiftable supports for the propelling member are arranged in groups, each group being linked to a pneumatically powered actuator. The assembly is biased by its weight downwardly into a position in which the propelling member is out of article propelling position. When air under pressure is admitted to the actuator, the bias is overcome and the actuator shifts the supports upwardly into a position in which the propelling member is in article propelling position.

An article detecting sensor operates a valve interposed between the actuator and the source of pressurized air. An air bleed port is provided between the valve and the actuator having a very restricted orifice. When the valve is open, the amount of air escaping through the bleed port is insufficient to affect the operation of the actuator and, when the valve is closed, permits the air in the actuator to escape so slowly that the actuator shifting movement is delayed.

Referring specifically to FIG. 1 of the drawings, the numeral 10 indicates a conveyor track of conventional design having a pair of side rails 11 and article supporting rollers 12 at spaced intervals therebetween forming an article supporting and conveying surface. Beneath the rollers 12 is a continuously driven propelling member 13 moving in the direction of the arrow "A" and supported from beneath at generally equally spaced intervals by pressure rollers 14. Each pressure roller 14 is independently and pivotally supported on a hanger 15 permitting it to swing vertically, thus shifting the position of the propelling member 13 with relation to the bottom surfaces of the rollers 12. When the rollers 14 are raised, the propelling member 13 is in driving contact with the rollers 12, as indicated at both the right and left ends of FIG. 1. When lowered, the propelling member is disengaged from the rollers 12 as indicated in the central portion of FIG. 1.

The hangers 15 are arranged in groups with all hangers of each group being connected together for simultaneous operation by any suitable means such as the bar 16. The bar 16 is connected by a linkage 17 to an extension 18a of the piston 18 of an actuator 19 (FIGS. 2 and 4). The linkage 17 consists of a rocker rod 20 and a first arm 21 connecting it to the bar 16 and a second arm 22 connecting it to the piston rod extension 18a. The actuator 19 is of a standard construction and may be any of several commercially available types. It has an air chamber, one end of which is movable and connected to the piston 18 to reciprocate the piston in response to air pressure in the chamber. The weight of the pressure rollers and related linkage biases the piston to retracted position in the absence of sufficient air pressure in the chamber. The internal structure of the actuator 19 is not illustrated since it is conventional and other constructions performing the same functions may be utilized.

The actuator 19 receives its air through the conduit 30 which connects it to the valve 31 (FIG. 1). The valve 31 is of the on-and-off type and controls the admission of air to the actuator 19 from the supply conduit 32 common to all the actuators of the conveyor. Between the valve 31 and the conduit 30 is an air bleed port 33 (FIG. 3). The air bleed port 33 has a chamber 34 (FIG. 5) in open communication with the conduit 30. It also has an orifice 35 communicating with the chamber 34 through a filter 36. In the orifice is a metering valve 37 which may be adjusted by turning to regulate precisely the volume of air which can escape through the orifice. Air passing through the orifice 35 is discharged to the atmosphere through the opening 38.

The valve 31 is mounted on a bracket 40 which also supports the standard 31 (FIG. 2). A lever 42 is pivotally mounted to the top of the standard 41 and projects over the top of the valve 31. In so doing, it is connected to the operating plunger 43 of the valve permitting pivotal movement of the lever 42 to actuate the valve. The free end 44 of the lever 42 projects beyond the valve 31 where it is in camming contact with the lower end of the bracket 45. The bracket 45 pivots about its support 46 and, at its upper end, is equipped with a sensing roller 47. The valve 31 biases the lever 42 upwardly. The bracket 45 is biased into a position with the sensing roller 47 raised slightly above the plane of the tops of the supporting rollers 12 by a spring 48. The valve 31 is of the normally closed type and is held open only when the lever 42 is forced downwardly. It will be seen that an article passing over the sensing roller 47 will depress it to the plane of the conveyor rollers 12. This swings the lower end of the bracket 45 to the right, as seen in FIG. 2, relieving the lever 42 so it can rise sufficiently to permit the valve 31 to close.

FIGURES 6 and 7 schematically illustrated the application of this invention to a conveyor 10a in which the propeller member 13a, in raised position, is generally coplanar with the conveying surface formed by the top surfaces of the rollers 12a. The identical arrangements is used as in the conveyor illustrated in FIG. 1 except the hangers 15a for the propeller members are raised to compensate for the absence of the rollers 12 above the belt. Again, the hangers 15a are arranged in groups with the hangers of each group tied together by a rod 16a. The operation of the conveyors 10 and 10a is identical so far as the operation of the propelling member raising and lowering mechanism is concerned.

It will be noted that the pressure rollers 14 are arranged in groups along the conveyor. In FIG. 1 the groups are identified by the letters B, C and D. The sensing roller for one group is located adjacent the discharge end (in the direction of the article movement as indicated by the arrow E) of the next adjacent group downstream of the conveyor in the direction of article movement. Thus, the sensing roller 47a controls the position of the pressure rollers 14 of group B and the sensing roller 47b those of group C. Thus, as illustrated in FIG. 1, the article F, by resting on sensing roller 47b, has caused the pressure rollers of group C to swing down while the pressure rollers of group D, under the article, remain raised. As will be explained in the following paragraph, the downward movement of the pressure rollers of group C will occur only after the sensing roller 47b has been held down for a predetermined interval.

The operation of the conveyor will now be explained. Air under presure from any suitable source normally available in industrial plants is fed into the main supply conduit 32 which in turn is connected to each of the valves 31. The valves 31 are held open by the sensing rollers admitting air to the actuators 19. This causes the actuators to support the pressure rollers 14 in raised position and thus the conveyor is in article propelling condition.

When the air bleed port 33 is properly set, a predetermined time interval, such for example as 2–5 seconds, will elapse between the closing of the valve 31 and the escape of sufficient air to permit the actuator to shift to a position lowering the pressure rollers 14. When the air bleed valve is properly set, this time interval will be sufficient to permit an article moving at the normal speed of the conveyor to pass over a sensing roller 47 and then release it before the actuator responds to the closing of valve 31. In effect, the air trapped in the system behind the valve 31 acts, under normal circumstances, to cancel the signal generated by the actuation of a sensing roller. Thus, repeated interruption of the conveying function is eliminated and the life of the mechanism is materially extended.

It will be recognized that the length of the time interval appropriate for a particular installation will be governed by several factors, including the speed of the conveyor, the length of conveyor spanned by each group of pressure rollers and the size of the articles involved. Once these factors have been ascertained, the adjustable valve 37 can be set to produce the desired interval. The valve of the air bleed port may be made adjustable in the field or it may be preset and locked against further adjustment at the factory in accordance with the requirement sof the particular circumstances under which it will be operating.

What has been described is normal operation. However, should the article's normal progress be interrupted and the article remain on a sensing roller longer than the preset interval, the escape of air through the air bleed port 33 will cause the actuator 19 to function and the propelling member will drop. This creates a zone having no propelling force immediate upstream of the stalled article. This action will repeat sequentially upstream of the conveyor as more articles arrive, thus lengthening the accumulation zone. Thus, accumulation will occur automatically. Once this has happened, the release of the sensing roller 47 by the article will almost immediately restore the conveying function to the conveyor since the opening of the valve 31 will release such a volume of air that the actuator will respond quite rapidly. Again, the restoration of the conveying function will occur sequentially, article by article, upstream as each article resumes its form and movement.

The system can be operated on relatively low pressures such for example as 25 lb./sq. in. Further, since the only air loss is through the air bleed ports the air loss per operating unit is limited to a few cu. ft. of air an hour. For example, a conveyor with fifty operating units having their air bleed ports set to discharge seven cu. ft./hr. each, will use only 350 cu. ft. of air per hour.

It will be seen that this invention provides a quiet compact, relatively inexpensive and durable unit for conveyors. While a preferred embodiment of this invention has been illustrated and described, it will be recognized that modifications of the invention can be made without departing from its principles and such modifications are to be considered included in the hereinafter appended claims, unless these claims by their language expressly state otherwise.

We claim:

1. An accumulator conveyor having a track along which articles are transported and a continuously driven propelling member, supporting means, movably supporting said propelling member for movement into and out of article propelling position, said supporting means being arranged in groups along said track and biased away from article propelling position; and an actuator connected to each group of said supporting means for moving the same into article propelling position, an article detecting sensor associated with each group of said supporting means, the improvement in said conveyor comprising: each of said actuators being connected to a source of air under pressure; a valve normally held open between said source of air pressure and each of said actuators, one of said sensors connected to each of said valves for closing said valve when said sensor is actuated by an article on said track;

an air bleed port between each valve and its connected actuator, the orifice of said bleed port being such that a sufficient volume of air remains in said actuator to retain said supporting means in article propelling position during a time interval of predetermined length between the closing of said valve and the shifting of said actuator in response to the closing off of the source of air under pressure to permit said support means to move out of article propelling position, the time interval being greater than that required for an article moving along the conveyor at the established speed of the conveyor to pass over and release the sensor.

2. An accumulator conveyor as described in claim 1 wherein said air bleed port has a valve member said valve member being adjustable to vary the size of said orifice for changing the length of said time interval between the closing of said valve and the operation of said actuator in response to said valve closing for coordinating the length of the time interval with the operating speed of the conveyor and the size of the articles being transported.

References Cited

UNITED STATES PATENTS

| | | | |
|---|---|---|---|
| 1,589,080 | 6/1926 | Kyle | 91—35 |
| 1,656,730 | 1/1928 | Hanna | 91—35 |
| 3,225,893 | 12/1965 | Currie | 198—127 |

RICHARD E. AEGERTER, *Primary Examiner.*

U.S. Cl. X.R.

91—52